J. J. C. SMITH.
MAKING PRINTER'S TYPE.
No. 43,648. Patented July 26, 1864.
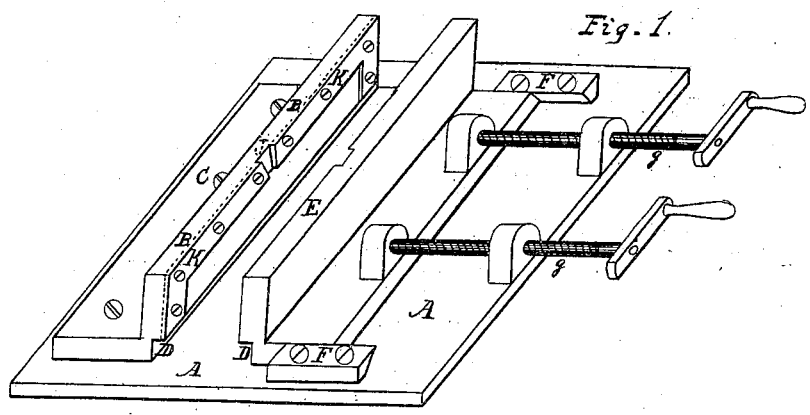
Fig. 1.
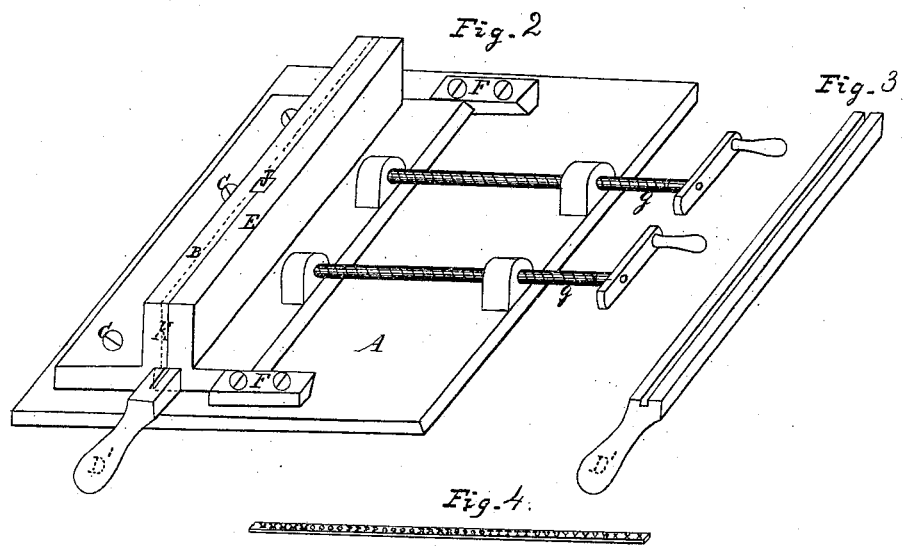
Fig. 2.
Fig. 3.
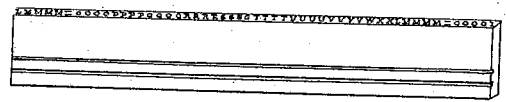
Fig. 4.
Fig. 5.

UNITED STATES PATENT OFFICE.

JOHN JOS. CH. SMITH, OF PHILADELPHIA, PENNSYLVANIA.

IMPROVEMENT IN MAKING PRINTERS' TYPES.

Specification forming part of Letters Patent No. 43,648, dated July 26, 1864; antedated July 19, 1864.

*To all whom it may concern:*

Be it known that I, JOHN JOS. CH. SMITH, of the city of Philadelphia, and State of Pennsylvania, have invented a new and useful Process of Making Printing-Type; and I do hereby declare that the following is a full and exact description thereof, reference being had to the accompanying drawings and the letters of reference marked thereon.

The object of my invention is to obtain printing-type by casting a strip of type-metal, which strip has on one edge a row of type heads or faces, separated from each other by intervening spaces sufficient to allow a saw to be passed between them without injuring them in the operation of cutting the strip into single type. Figure 5 is a perspective view of such a strip.

To enable others skilled in the art to apply my process, I will proceed to describe it.

To obtain the matrix which I use for the mold in which I cast my strips, I proceed in this manner: I take type, set them up in a straight row, placing a blank space after each type, the spaces being uniformly of a thickness equal to that of the saw used in the machine for cutting. The last-named machine I have described in a separate application for Letters Patent, said application being filed concurrently herewith. From these so set up type I take a matrix of the type-heads by means of electrotyping. The matrix is then nicely fitted and fastened into a bar of iron, steel, or brass, which bar has a middle groove, the bar and groove being represented at D' in Fig. 3. The groove must correspond in width and depth with the matrix to be inserted and fixed into it. The matrix so made is ready for continual use in combination with the mold represented in perspective in Figs. 1 and 2.

I will now describe the mold. A is a straight iron plate about fifteen inches long and twelve inches wide. To this plate an angular bar, B, is fixed by means of screws C. This bar is cut out along its whole length, as shown at D.

E represents another angular bar, which is arranged in such a manner that it may be slid to and from bar B in dovetail guides F by means of two screws G. This bar E is also cut out along its whole length, as shown at D. When the bars B and E are brought together by the screws, the cuts D will form a space into which the above-described matrix-bar D' is pushed, thereby closing up the mold at the bottom and bringing the matrix into the right position. The melted type-metal is then poured into the mold at the opening J, producing a strip with a series of type-heads on one edge. The thickness of the type heads is adjusted by a plate of steel or brass screwed to the face of bar B, as shown by K, the thickness of this plate being equal to the required size of the type to be cast in the mold.

For the purpose of making type having heads of electrotyped copper, I proceed in this manner: I take a series of type-strips, prepared as above described. From them I take a fac simile plate in the well-known way of electrotyping. This plate I coat with tin or solder on its back, and then I cut it up into strips, each of which consists of a number of type-heads separated from each other by intervening spaces, as aforesaid. One of these strips is shown in Fig. 4. I then place the strip, face down, into the groove of a bar of iron similar to that represented in Fig. 3. This groove must correspond in depth and width with the electrotyped strip, which is laid in it fitting it loosely. I then place the bar over a fire long enough to melt the tin or solder on the back of the strip. The bar is then removed from the fire and slid into the opening D in the bottom of the mold. I then fill the mold with melted type-metal which unites perfectly with the electrotyped strip of type-heads, thus producing a strip with electrotyped type-heads on one edge.

The strips are afterward, by means of the machine above referred to, cut up into single type of such perfection that no additional work is required to finish them for printers' use.

Having thus described my invention, what I claim, and desire to secure by Letters Patent, is—

The manufacturing of printing-type by first casting single strips of metal, such as above described, and then cutting up the strips into single type, substantially as set forth.

JOHN JOS. CH. SMITH.

Witnesses:
 J. E. SHAW,
 CHAS. B. HELFENSTEIN.